United States Patent [19]

Jeffers et al.

[11] Patent Number: 5,231,469
[45] Date of Patent: Jul. 27, 1993

[54] LASER POSITION INDICATOR FOR VALVE STEM

[75] Inventors: Larry Jeffers, Alliance; John Hayes, Port Clinton, both of Ohio

[73] Assignee: Combustion Engineering, Inc., Windsor, Conn.

[21] Appl. No.: 924,371

[22] Filed: Jul. 31, 1992

Related U.S. Application Data

[63] Continuation of Ser. No. 634,419, Dec. 27, 1990, abandoned.

[51] Int. Cl.$^5$ .................... G01B 11/14; F16K 31/02
[52] U.S. Cl. ............................ 356/373; 251/129.01
[58] Field of Search ............. 356/373, 375, 376, 228; 73/168; 364/551.01; 251/129.01, 129.02

[56] References Cited

U.S. PATENT DOCUMENTS

| | | | |
|---|---|---|---|
| H277 | 5/1987 | Lee et al. | 356/373 |
| 3,698,817 | 10/1972 | Iimura et al. | 356/373 |
| 3,937,574 | 2/1976 | Peckham et al. | |
| 4,274,438 | 6/1981 | LaCoste | |
| 4,389,962 | 6/1983 | Stoll | 356/373 |
| 4,523,286 | 6/1985 | Koga et al. | |
| 4,624,570 | 11/1986 | Bertollini | 356/373 |
| 4,922,307 | 5/1990 | Schaffer | 356/373 |
| 4,976,144 | 12/1990 | Fitzgerald | |
| 5,056,046 | 10/1991 | Mutchler et al. | 364/551.01 |

FOREIGN PATENT DOCUMENTS

| | | |
|---|---|---|
| 0275229 | 1/1988 | European Pat. Off. |
| 2916159 | 10/1980 | Fed. Rep. of Germany |
| 2455701 | 4/1980 | France |
| 0233305 | 9/1988 | Japan ........................ 356/373 |
| 2194648 | 3/1988 | United Kingdom |
| WOA9015948 | 12/1990 | World Int. Prop. O. |

OTHER PUBLICATIONS

Automated Trouble Sheeting of Pneumatically Operated Control Valve, W. P. V. Fitzgerald, EPRI CS/NP-5878-SR, EPRI Power Plant Valves Symposium, Jun. 1988.
Patent Abstracts of Japan vol. 9, No. 209 (M-407) (1932) Aug. 27, 1985.
Keyence LB Series Laser Brochure (pp. 4-7).

*Primary Examiner*—Richard A. Rosenberger
*Assistant Examiner*—Hoa Q. Pham
*Attorney, Agent, or Firm*—L. James Ristas; John H. Mulholland

[57] ABSTRACT

The displacement of a valve stem (16) is measured during diagnostic testing by temporarily mounting a laser head (112) on the valve body (18) or yoke (20), for generating a source laser beam (118) that reflects from a target (120) that moves with the stem. The timing of the reflected beam (132) returning to the head (112) relative to the projection of the source beam, gives an indication of the displacement of the stem.

26 Claims, 1 Drawing Sheet

LASER POSITION INDICATOR FOR VALVE STEM

This is a continuation of copending application Ser. No. 07/634,419 filed on Dec. 27, 1990 now abandoned.

BACKGROUND OF THE INVENTION

The present invention relates to valve diagnostics, and more particularly, to the non-intrusive measurement of valve stem displacement during valve actuation.

Diagnostic techniques for determining the operating characteristics of valves in the field have been in general use for a number of years. These techniques usually involve connecting sensors of various types to portions of the valve system whereby upon actuation of the valve, a record of the relationship between the independent actuating variable and the dependent response variable can be obtained and analyzed. The response variable can be force-related or displacement-related, depending on the type of valve and the accessibility of the components in the transmission mechanisms in the valve. Desirably, the response variable is sensed as close as possible to the valve seat, thereby obtaining a more reliable indication of the actual thrust of the valve member against the seat for a given degree of actuation.

U.S. patent application Ser. No. 610,450 filed Nov. 8, 1990 (now U.S. Pat. No. 5,056,046) as a Continuation-In-Part of U.S. patent application Ser. No. 368,604 filed Jun. 20, 1989 (now abandoned) discloses a non-intrusive technique for measuring the stem displacement of a valve of the type in which a portion of the stem is visible. The preferred embodiment of the sensor is sensitive to light, especially in the visible spectrum whereby discrete signals generated in a video camera due to movement of the stem, are converted to distance units for measuring the stem displacement. This technique is easy to implement in the harsh environment of a nuclear power plant, and provides sufficient resolution for achieving improved diagnostics relative to previously available techniques.

The need for even more easily implemented, more precise techniques continues to grow, however, and the present invention represents such improvement.

SUMMARY OF THE INVENTION

It is thus an object of the present invention to provide an easily implemented, non-intrusive valve stem displacement measuring apparatus and method for a valve diagnostic system.

This object is accomplished in accordance with the present invention, by temporarily mounting a laser beam source and a laser beam sensor at the valve body so that the source beam is influence by the movement of the stem and this influence is manifested at the sensor.

Preferably, a reflective target is mounted on the stem and the laser source and reflector are mounted in stationary positions on the valve body or yoke. The movement of the stem influences the time interval required for the source beam to travel to the target and the reflected beam to travel from the target to the sensor. The source and sensor can be housed in a single head that is easily secured to the valve body adjacent the stem, with the source beam projecting substantially in parallel with the stem and the reflected beam returning to the head substantially in parallel with the source beam.

BRIEF DESCRIPTION OF THE DRAWINGS

These and other objects and advantages of the invention will be described in greater detail below with reference to the accompanying drawings, in which.

DESCRIPTION OF THE PREFERRED EMBODIMENT

Figure 1:
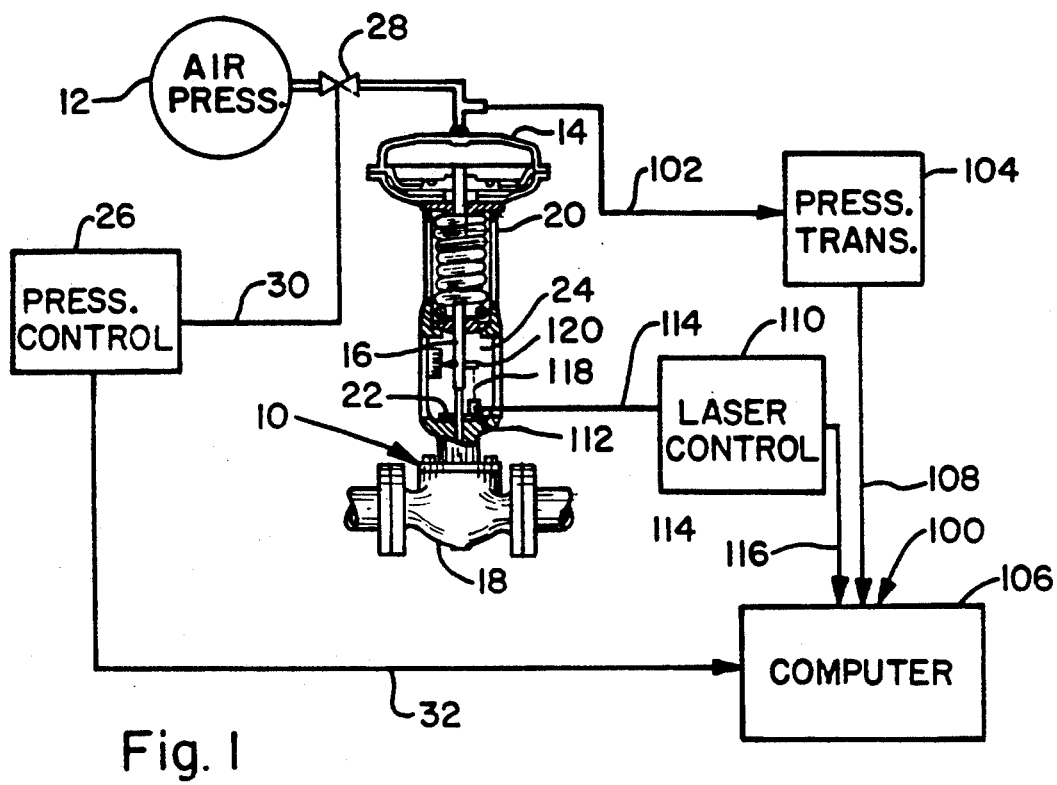
FIG. 1 is a schematic representation of a diagnostic system that embodies the present invention, as deployed on a pneumatic valve.

FIG. 1 schematically represents a conventional valve 10 installed in a plant, such as a pneumatically operated valve in a nuclear power plant. In such a valve, a source 12 of high pressure is selectively applied to the actuation chamber 14 of the valve, by which a diaphragm (not shown), is forced downwardly against the stem 16, which in turn urges the valve member (not shown) against a valve seat (not shown) in the valve body 18. The actuation chamber 14, or operator, is rigidly connected to the body 18, by a yoke 20 extending therebetween. The stem 16 enters the body 18 axially through a penetration in the body upper surface 22.

The nominal or design relationship of stem displacement as a function of pressure as controlled by the valve controller 26 and associated control valve 28 via line 30, is known from the manufacturer, but the actual relationship under field conditions can be significantly different. The actual relationship is one of the characteristics for which data can be acquired with the present invention.

A valve data acquisition system 100 is selectively, and preferably portably, connectable to the valve 10 as part of a periodic program of valve diagnostic testing for installed valves. A pressure tap 102 and associated transducer 104 senses the pressure applied to the operator 14, and delivers a signal commensurate therewith to computer or intermediate data processor 106 via line 108. In accordance with the present invention, the dependent parameter of stem displacement is measured by a laser-based detector operated through controller 110. The controller 110 receives a first signal from the laser sensor head 112 via line 114, and delivers a conditioned second signal commensurate with stem displacement to computer 106 along line 116. Optionally, a signal from the pressure controller can be delivered via line 32 to the computer 106 for comparison with the pressure signal on line 108.

At the time data are to be acquired from a particular valve 10, the diagnostic or data acquisition system 100 is located adjacent the valve and the pressure tap 102 connected. The sensor head 112 is mounted on the body upper surface 22 so that a source laser beam 118 can be projected upwardly substantially in parallel with the stem 16. A small target 120 that highly reflects light at the wavelength of the source beam 118, is connected to the stem so that the target is in the path of source beam 118. The head 112 preferably also includes a sensor responsive to the reflected beam, which returns to the head along a path that is only slightly angled relative to the path of the source beam 118, i.e., the reflected beam is substantially parallel to the source beam as would be observed by the human eye.

It should be appreciated that in most pneumatically operated valves, appreciable free space 24 exists among the axially extending structures that define the yoke 20. Thus, not only is a portion of the stem 16 visible, but an undisturbed, longitudinal channel is available within which the beam 118 can be established and the target 120 can reciprocate. The present invention can be implemented in other types of valves where similar conditions exist. In other words, regardless of the type of operator or the path of stem movement, the invention can be implemented so long as the target can move without obstruction and the beam can be projected from the source and reflected by the target to the sensor, from at least the positions along the path of movement of the target corresponding to a known initial actuation or actuated condition (e.g., fully open) and a final actuation or actuated condition (e.g., fully closed). If the free space 24 is ample, the sensor head 112 can be mounted in fixed relation relative to (e.g., on) the stem, and the target member can be a stationary reflective surface in fixed relation to the body, i.e., at 22.

Figures 2, 3:
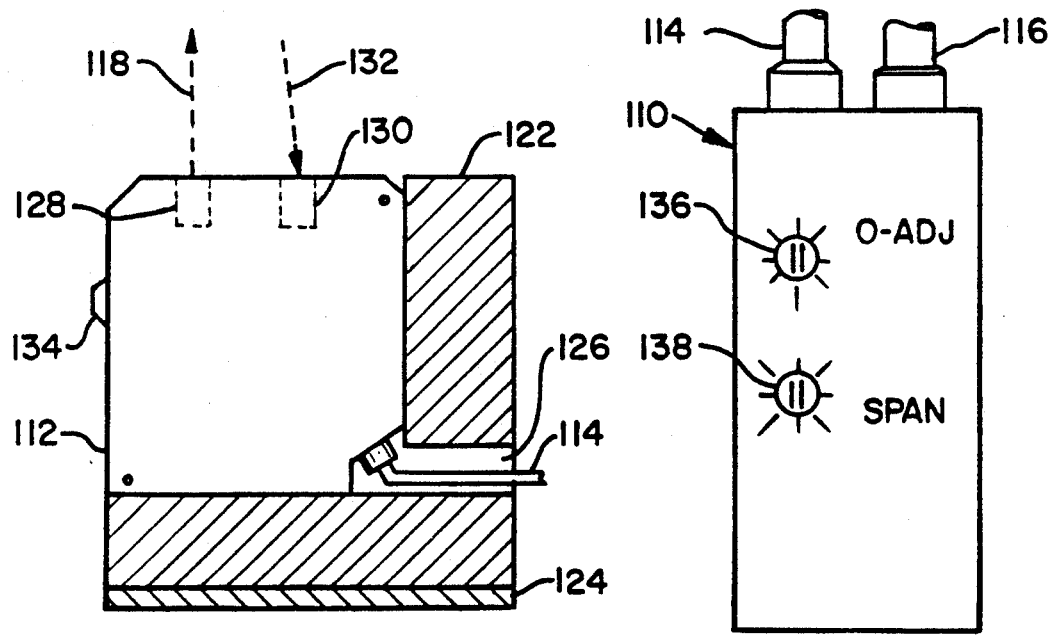
FIG. 2 is a partially cut view of the preferred laser sensor head of FIG. 1, which contains a laser beam source, reflected beam sensor, and optical-to-electrical transducer.
FIG. 3 is an elevation view of the controller for the sensor head shown in FIG. 2.

FIG. 2 shows the preferred form of the sensor head 112. Head 112 has substantially square opposed sides and a thickness into the plane of the drawing that is less than one half the dimension of one edge of the square. Preferably, the head 112 is secured in a protective, generally L-shaped mounting block 122 that has a flat lower surface 124 treated to adhere to the upper surface 22 on valve body 18 adjacent the stem 16 (see FIG. 1). The block 122 includes an opening 126 through which the sensor line or cable 114 connects to controller 110. The head 112 fits in the notch of mounting block 122 such that source beam lens 128 and sensor lens 130 are exposed, to project source beam 118 upwardly and receive the downwardly reflected beam 132, respectively. For reasons to be explained below, an LED 134 on the sensor head is also exposed.

A sensor head of the type described with respect to FIG. 2, is commercially available as the Keyence Model LB-01 from the Keyence Corporation of America, Fairlawn, N.J. The preferred controller 110, shown schematically in FIG. 3, is Model LB-60. When used together, they provide a measurement range of 60–140 mm using a semiconductor laser at a wavelength of 780 nm. The spot diameter projected on the target is about 1.0×2.0 mm. From the centered zero setting at the midpoint distance of the range, i.e., at 100 mm, the linearity is about 1.5 per cent to either end of the range and better than 1.0 per cent within +/−20 mm of the midpoint. Resolution on the order of tens of micrometers is far better than with other techniques. With the indicated controller 110, the output signal delivered to the computer 106 along line 116 (see FIG. 1) is an analog voltage that varies substantially linearly with target movement along a straight line toward or away from the sensor head 112. The time interval between the projection and receipt of a given wave or pulse is converted to a voltage within the controller 110 in response to the energy patterns at lenses 128, 130. The output voltage can readily be converted to digital form either with a preprocessor (not shown) between the controller 110 and the computer 106, or in a data interface in the computer, according to well known techniques. The zero voltage output of the controller 110 can be adjusted to any distance within the measurement range of head 112 by turning trimmer dial 136. Also, the voltage span can be adjusted +/−30 per cent from the nominal response of 1 volt per centimeter, with trimmer 138.

Calibration of the head 112 is preferably completed before the technician enters the process area of the plant where the valves are to be tested. The conventional power supply (not shown) is connected and a sample target 120 is located a distance from the sensor head 112 approximately equal to the distance the target will be from the sensor head on the valve, when the valve is at the initial test condition, e.g., fully open. When the target is within the measurement range, the LED 134 lights yellow, and when the target is placed near the center of the measurement range (at about 100 mm) the LED lights green. The zero voltage trimmer 136 is then adjusted as needed or desired, and the output is checked to assure that a voltage proportional to target displacement is obtained. Once calibrated, the same head 112 and target 120 can be used repeatedly for acquiring stem displacement data from many valves.

The capability to calibrate with the controller 110 in advance and the ease with which both the target 120 and head 112 can be mounted on the valve stem 16 and body portion 22, respectively, enable a technician in protective clothing to quickly set up and perform the data acquisition procedures at a given valve. The technician need not precisely locate the target 120 on the stem, because the important dependant variable is stem absolute displacement, not absolute position. Thus, as long as the stem displacement corresponding to a full stroke of the valve is less then the measurement range of the head 112, the technician can use a simple ruler or the like to mount the target 120 an acceptable distance from the head 112. In a less desirable embodiment, the source beam lens and the reflected beam lens could be situated in different heads, but calibration would be more difficult unless the heads remained in a fixed geometric relationship.

Thus, it should be appreciated that the present invention accomplishes the objectives stated above. Moreover, the invention can be used in other types of fluidly operated valves, and in valves having a predefined path of stem movement other than strictly linear, e.g., screw or rotary. For measuring rotary displacement, the laser source beam would be directed transversely to the stem axis so as to intersect the path of the target at a plurality of points along the path. Furthermore, the target could be integral with or a permanent appendage to the stem, so long as it has, or can be modified to have, a reflective surface that traces a repeatable path commensurate with the path of the stem itself.

Although an illustrative embodiment has been described, the scope of exclusive rights sought to be protected by letters patent is not limited to the illustrated embodiment, but rather is defined by the appended claims.

We claim:

1. A system for acquiring stem displacement data from a valve in the field, comprising in combination:

a valve having a body, an operator, and a stem driven in response to actuation of the operator so as to move along a predefined path to position a valve member between open and closed conditions within the body;

a target member in fixed relation to the stem for tracing a target path commensurate with the path of the stem traced when said stem is actuated, wherein the target member has a light-reflecting surface;

first means, removably mounted in fixed relation to the body, for projecting a laser source beam into the path traced by the reflecting surface of the target member so as to produce a reflected beam that is influenced by the movement of the target member;

second means, removably mounted in fixed relation to the body, for sensing the influenced reflected beam; and third means, coupled to the first and second means, for generating an output signal commensurate with the distance travelled by the target member along the target path when said stem is actuated.

2. The system of claim 1, wherein body and the operator, the target member is appended to the stem such that the target member traces the target path within the yoke, and the first and second means are mounted so that the source and reflected beams pass through the yoke.

3. The system of claim 2, wherein the first means and the second means are mounted on the body such that the beams are established substantially in parallel with the stem.

4. The system of claim 1, wherein the first means and the second means are mounted on the body such that the beams are established substantially in parallel with the stem.

5. The system of claim 1, wherein the first and second means are contained within a single sensor head removably mounted on the valve.

6. The system of claim 5, wherein the valve operator is fluidly actuated, and the system includes fourth means, connected to the operator, for generating a signal commensurate with the fluid pressure in the operator while the third means generates the output signal commensurate with the distance travelled by the target member.

7. The system of claim 6, wherein the valve is pneumatically operated.

8. A system for acquiring stem displacement data from a valve in the field, the valve having a body, an operator, and a stem driven by the operator along a predefined path to position a valve member between open and closed conditions within the body, comprising:

a target member removably mounted on the stem for tracing a target path commensurate with the path of the stem traced when said stem moves between said open and closed conditions of the valve member, wherein the target member has a light-reflecting surface;

first means, removably mounted on the valve in fixed relation to the body and remote from the target member, for projecting a laser source beam into the path traced by the reflecting surface of the target member so as to produce a reflected beam that is influenced by the movement of the target member;

second means, removably mounted in fixed relation to the body, for sensing the influenced reflected beam; and third means, coupled to the first and second means, for generating an output signal commensurate with the distance travelled by the target member along the target path when said stem moves between said open and closed conditions of said valve member.

9. The system of claim 8, wherein the valve includes a yoke surrounding the stem between the body and the operator, the target member is appended to the stem such that the target member traces the target path within the yoke, and the first and second means are mounted so that the source and reflected beams pass through the yoke.

10. The system of claim 9, wherein the first and the second means are mounted on the body such that the beams are established substantially in parallel with the stem.

11. The system of claim 8, wherein the first and the second means are mounted on the body such that the beams are established substantially in parallel with the stem.

12. The system of claim 8, wherein the first and second means are contained within a single sensor head removably mounted on the valve.

13. The system of claim 12, wherein the valve operator is fluidly actuated, and the system includes fourth means, connected to the operator, for generating a signal commensurate with the fluid pressure in the operator while the third means generates the output signal commensurate with the distance travelled by the target member.

14. The system of claim 13, wherein the valve is pneumatically operated.

15. A method for acquiring characteristic data from a valve in the field, wherein the valve includes a body, a movable stem having one end penetrating the body for moving a valve member between open and closed flow conditions and another end connected to an operator that is actuated by an energy source, comprising the steps of:

projecting a laser source beam from a source temporarily mounted on the valve to reflect from a reflecting surface which is temporarily mounted on the valve and which moves remote from the source, commensurately with the movement of the stem as the operator is actuated;

sensing a reflected beam from said reflecting surface while the reflecting surface is at a plurality of positions resulting from the movement of the stem; and from the source beam and the reflected beam, determining the distance between two of said plurality of positions.

16. The method of claim 15, further comprising the steps of, measuring a variable commensurate with the actuation energy applied to the operator, and correlating said applied energy with said determined distance.

17. The method of claim 16, wherein, for a given valve, after the reflected beam has been sensed for a plurality of positions and the variable commensurate with the actuation energy has been measured, the source and target from said given valve are removed from said valve and temporarily mounted on another valve where the method steps recited in claim 16 are repeated.

18. The method of claim 17, wherein the relationship between the time interval for the source beam to travel from the laser source to the target surface, and the spacing between the laser source and target surface, is calibrated before the source and target surface are mounted on said given valve, and the removal of the source and target, the mounting thereof on said other valve, and the repeating of said steps on said other valve, are performed without recalibration.

19. The method of claim 15, wherein the steps of projecting and sensing are preceded by the step of temporarily mounting a laser generator and a laser beam sensor adjacent the stem.

20. A system for acquiring stem displacement data from a valve having a body, an operator, and a stem driven in response to actuation of the operator so as to move along a predefined path to position a valve member between open and closed conditions within the body, comprising:
 a target surface removably fixed in relation to one of the stem or the valve body;
 first means remote from the target surface, for projecting a laser source beam;
 second means remote from the target surface, for receiving a laser beam, said first and second means being mounted fixedly relative to each other and removably fixed relative to the other of said steam or valve body, such that the source beam from the first means projects onto said target surface and reflects from the target surface onto the second means whereby the reflected beam is influenced by the movement of the stem; and
 third means, coupled to the second means, for generating an output signal commensurate with the influence of the stem movement on the reflected beam.

21. The apparatus of claim 20, wherein the target member is a surface removably fixed in relation to the body, the first means and second means are in fixed relation to each other but movable with the stem, and the third means generates an output signal commensurate with the movement of the first and second means relative to the target member.

22. The system of claim 20, wherein the first and second means are closely spaced for projecting and receiving source and reflected beams, respectively.

23. The system of claim 20, wherein the third means is coupled to the first and second means, for generating an output signal commensurate with the influence of the stem movement on the time interval between the projection of a source beam wave and the sensing of said wave as reflected from the target surface.

24. A method for acquiring characteristic data from a valve in the field, wherein the valve includes a body, a movable stem having one end penetrating the body for moving a valve member between open and closed flow conditions and another end connected to an operator that is actuated by an energy source, comprising the steps of:
 attaching a target surface to the valve is fixed relation to one of the valve body or valve stem;
 temporarily mounting a laser beam source in fixed relation to the other of said valve body or stem after the valve has been installed in the field;
 projecting a laser beam from the source onto the target surface, thereby establishing a reflected beam from the target surface;
 actuating the stem;
 sensing the reflected beam from a plurality of positions of the actuated stem; and
 from the sensed reflected beam, determining the distance between two of said plurality of positions.

25. The method of claim 24, wherein the step of projecting includes the step of establishing an uninterrupted reflected beam that is continuously influenced as the stem is actuated.

26. The method of claim 25 including the steps of:
 generating a first signal commensurate with the sensed reflected beam;
 from the first signal, delivering a second signal commensurate with stem displacement to a data processor, and
 while the valve remains installed, demounting said source after the second signal is delivered to the data processor.

* * * * *

UNITED STATES PATENT AND TRADEMARK OFFICE
CERTIFICATE OF CORRECTION

PATENT NO. : 5,231,469
DATED : July 27, 1993
INVENTOR(S) : Larry Jeffers and John Hayes It is certified that error appears in the above-indentified patent and that said Letters Patent is hereby corrected as shown below:

Column 5, delete lines 12 and 13 and insert in place thereof:
--2. The system of claim 1, wherein
   the valve includes a yoke surrounding the stem between
      the body and the operator,--

Column 8, line 12, change "is" to --in--.

Signed and Sealed this

Third Day of December, 1996

Attest:

BRUCE LEHMAN

Attesting Officer   Commissioner of Patents and Trademarks